(No Model.)
F. F. LANDIS.
DISCHARGE PIPE FOR STRAW STACKERS.
No. 522,760. Patented July 10, 1894.
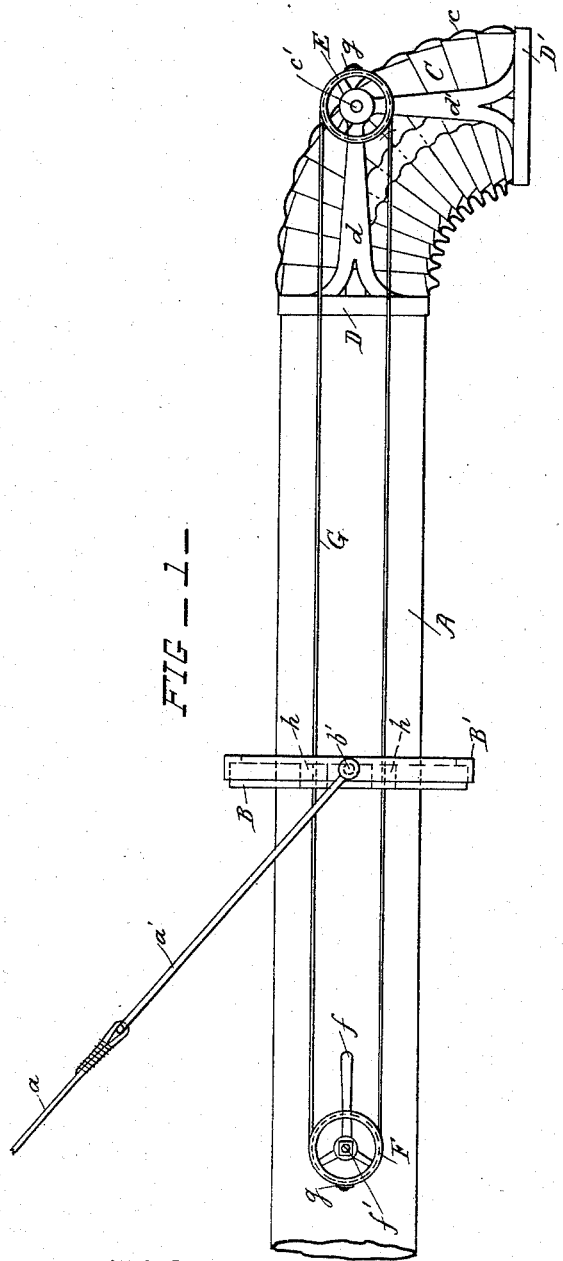
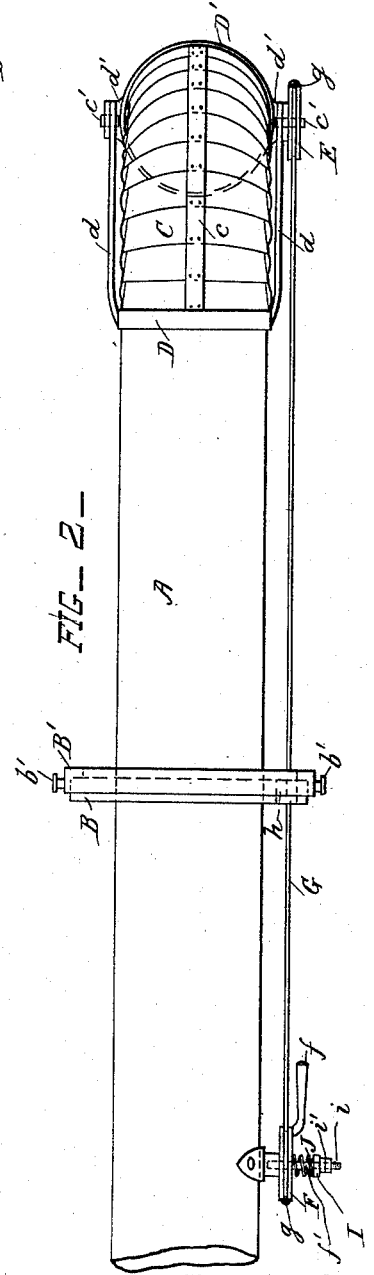

UNITED STATES PATENT OFFICE.

FRANK F. LANDIS, OF WAYNESBOROUGH, PENNSYLVANIA.

DISCHARGE-PIPE FOR STRAW-STACKERS.

SPECIFICATION forming part of Letters Patent No. 522,760, dated July 10, 1894.

Application filed January 26, 1894. Serial No. 498,123. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Discharge-Pipes for Straw-Stackers; and I do hereby declare the following to be a full, clear, and exact description of the invention, such as will enable others skilled in the art to which it appertains to make and use the same.

This invention relates to the discharge pipes of pneumatic straw stackers used in connection with thrashing machines; and it consists in the novel construction and combination of the parts hereinafter fully described and claimed whereby the deflector at the end of the discharge pipe is adjusted and controlled.

In the drawings: Figure 1 is a side view of the discharge pipe; and Fig. 2 is a plan view of the same.

A is the discharge pipe of a pneumatic straw stacker such as shown in the Patent No. 514,266, issued to me on February 6, 1894. This discharge pipe is revoluble upon its own axis and is supported in such a manner as to permit it to be raised or lowered, and swung around in either direction.

The discharge pipe is supported by means of a cord $a$, or other equivalent device, provided with a bail $a'$ at its end. B is a collar secured on the pipe A, and B' is a collar mounted on the collar B and provided with projecting pins or lugs $b'$ to which the ends of the bail are connected.

The deflector attached to the end of the discharge pipe for the purpose of changing the direction of the straw as it issues from the pipe, preferably consists of a series of articulated conical segments C which are connected together by three or more leather straps $c$. The end segments of the deflector pipe are secured to the end pieces D and D', the end piece D being secured to the end of the discharge pipe A. The end pieces D and D' are, respectively, provided with arms $d$ and $d'$ projecting substantially at right angles from them upon each side, and these arms are pivoted together by the pins $c'$. One of the arms $d'$ has a sheave E secured to it, concentric with the pins $c'$.

A sheave F provided with an operating handle $f$ is pivoted on a pin $f'$ which is supported by the discharge pipe A in any position where it can be readily reached by the man operating the straw stacker.

G is a flexible connection which passes around the sheaves E and F. This connection may be a cord, wire, wire rope, chain, or any other equivalent device, and may be provided, if desired, with any approved device for keeping it taut, and with guide sheaves if it cannot be conveniently passed in straight lines from one sheave to the other. The connection G may be secured to the sheaves by clips $g$, or it may drive by frictional contact with them. In order that the connection G may not strike the bail $a'$ when the discharge pipe is revolved, apertures $h$ are formed in the collar B for it to pass through, and the opening through the collar B' is made large enough to clear the said flexible connection.

In order to prevent the deflector from moving automatically from any position in which it has been placed, a washer I is slid upon the screwthreaded end $i$ of the pin $f'$. This washer is set up by the nut or nuts $i'$, and may be caused to press against the side of the sheave F direct, but by preference a spring J is interposed between the said washer and sheave. This permits the frictional resistance of the brake to be nicely adjusted, and the strain due to this resistance is not thrown upon the flexible connection G while being operated by the handle $f$.

What I claim is—

1. The combination, with the discharge pipe; of an adjustable deflector consisting of two end pieces each provided with arms arranged substantially at right angles to them, one on each side, and having their meeting ends pivoted together, a series of articulated segments, and a series of flexible bands connected to the said segments and end pieces; and means for operating the movable end piece of the deflector, substantially as set forth.

2. The combination, with the revoluble discharge pipe provided with an adjustable deflector having a sheave for operating it, of a second sheave journaled at the lower part of the discharge pipe, a flexible connection passing around the said sheaves, a collar secured to the middle portion of the said pipe and provided with apertures for the said flexible connection to pass through, an outer collar encircling the aforesaid collar, and a supporting device—such as a cord—connected with the said outer collar, substantially as set forth.

In testimony whereof I affix my signature in presence of two witnesses.

FRANK F. LANDIS.

Witnesses:
ALFET RUSSELL,
CAL KROME.